(12) United States Patent
Kiekhaefer

(10) Patent No.: US 6,290,137 B1
(45) Date of Patent: *Sep. 18, 2001

(54) TRANSPARENT/TRANSLUCENT FINANCIAL TRANSACTION CARD INCLUDING AN INFRARED LIGHT FILTER

(75) Inventor: John H. Kiekhaefer, Bloomingdale, IL (US)

(73) Assignee: Perfect Plastic Printing Corporation, St. Charles, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/411,359

(22) Filed: Oct. 1, 1999

(51) Int. Cl.[7] .................................................. G06K 19/00
(52) U.S. Cl. .............................................. 235/487; 902/25
(58) Field of Search .................................. 235/487, 488, 235/491, 468, 490, 494; 902/25, 29

(56) References Cited

U.S. PATENT DOCUMENTS

| | | | |
|---|---|---|---|
| D. 406,861 | 3/1999 | Leedy, Jr. | D19/10 |
| 3,536,894 * | 7/1965 | Travioli | 235/101 |
| 3,763,356 * | 10/1973 | Berler | 235/468 |
| 3,836,754 * | 9/1974 | Toye et al. | 235/488 |
| 3,919,447 | 11/1975 | Kilmer, Jr. et al. | 428/138 |
| 3,987,725 * | 10/1976 | Scantlin | 902/29 X |
| 4,436,991 * | 3/1984 | Albert et al. | 235/468 |
| 4,544,836 * | 10/1985 | Galvin et al. | 234/487 |
| 4,694,148 | 9/1987 | Diekemper et al. | 235/468 |
| 4,837,134 | 6/1989 | Bouldin et al. | 430/445 |
| 4,950,877 * | 8/1990 | Kurihara et al. | 235/480 |
| 5,005,873 * | 4/1991 | West | 235/491 X |
| 5,241,165 * | 8/1993 | Drexler | 235/488 |
| 5,300,764 | 4/1994 | Hoshino et al. | 235/487 |
| 5,410,142 * | 4/1995 | Tsuboi et al. | 235/488 |
| 5,434,404 * | 7/1995 | Liu et al. | 235/475 |
| 5,518,810 | 5/1996 | Nishihara et al. | 428/328 |
| 5,700,037 | 12/1997 | Keller | 283/107 |
| 5,856,661 * | 1/1999 | Finkelstein et al. | 235/487 |
| 6,019,284 * | 2/2000 | Freeman et al. | 235/380 |
| 6,074,726 | 6/2000 | Vezinet et al. | 428/195 |

FOREIGN PATENT DOCUMENTS

| | | |
|---|---|---|
| 2 106 832 * | 4/1983 | (GB). |
| 2 229 189 * | 9/1990 | (GB). |
| 11-20356 * | 1/1999 | (JP). |
| 11-53496 * | 2/1999 | (JP). |

OTHER PUBLICATIONS

Specimen of credit card offered for sale at least as early as Feb., 1974.

* cited by examiner

*Primary Examiner*—Michael G. Lee
*Assistant Examiner*—Jared J. Fureman
(74) *Attorney, Agent, or Firm*—Walter W. Duft; Joseph P. Gastel

(57) ABSTRACT

A financial transaction card is transparent or translucent to human viewing yet detectable by automated card processing equipment. The card includes a substantially planar material sheet having upper and lower surfaces bounded by a continuous peripheral edge. The material sheet has one or more areas that are at least minimally transparent or translucent with respect to human-visible light. A filter associated with at least one of the areas provides sufficient opacity to light that is detectable by sensors in the automated card processing equipment to render the card detectable by the equipment.

21 Claims, 3 Drawing Sheets

TRANSPARENT/TRANSLUCENT FINANCIAL TRANSACTION CARD INCLUDING AN INFRARED LIGHT FILTER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to financial transaction cards, including credit cards, debit cards, ATM (Automated Teller Machine) cards, and the like. More particularly, the invention relates to a financial transaction card which is transparent or translucent to human viewing yet can be detected by sensing devices in automated card processing equipment, such as embossing/encoding machines employed during card manufacturing, ATMs employed during card use, and other devices.

2. Description of the Prior Art

For some time, financial institutions have been interested in offering financial transaction cards having areas that are transparent or translucent to human viewing. Prior art efforts to achieve such design effects have produced the following examples:

- Cards incorporating transparent or translucent magnifying lenses.
- Cards incorporating transparent or translucent holograms.
- Cards incorporating transparent or translucent lenticular patterns.
- Cards incorporating other transparent or translucent optical effects.
- Cards that are partially transparent or translucent, but also have a high level of opacity provided by the presence of coating(s) containing fillers or pigmentation.

The perceived advantage of a transparent or translucent financial transaction card is that the card will be relatively unique in the marketplace and impart status to the card user as compared to other users who have only opaque cards. A bank or other entity offering a transparent or translucent card can potentially attract users who will preferentially select such a card over competitive opaque cards, and thereby provide income to the institution as a result of card usage.

A significant problem with transparent or translucent cards is that the cards also need to function properly when processed during manufacture in card embossing/encoding equipment, when deployed by users in ATMs, or when used in other automated card processing equipment. These machines utilize light transmission-based sensing devices that are not able to detect the presence of transparent or translucent cards. This is due to the fact that the sensing devices are not able to see the cards as opaque (light blocking). The light emitted from the light sources associated with such sensing devices passes through the cards rather than being blocked from reaching the sensing devices. To the best of applicant's knowledge, none of the transparent or translucent cards produced to date can be processed through embossing/encoding equipment, deployed in ATMs, or used in other automated card processing equipment.

Accordingly, there is a need for a transparent or translucent financial transaction card that overcomes the forgoing problem. What is required is financial transaction card that is transparent or translucent to human viewing in one or more areas of the card, yet which is detectable by automated card processing equipment, of any type.

BRIEF SUMMARY OF THE INVENTION

A solution to the foregoing problem and an advance in the art is provided by the present invention in which a financial transaction card has one or more areas that are at least minimally transparent or translucent to human viewing, yet the card is detectable by sensing devices in automated card processing equipment.

In a preferred embodiment of the invention, the card includes a substantially planar material sheet having upper and lower surfaces bounded by a continuous peripheral edge. The material sheet is formed to include the aforementioned one or more areas that are at least minimally transparent or translucent relative to human-visible light. A filter is associated with at least one of these areas and provides sufficient opacity to light detectable by the sensors in automated card processing equipment to render the card detectable by such equipment.

The automated card processing equipment may include ATMs having sensor/detector pairs operating in a light wavelength range of about 750–1200 nm. In that case, the filter should provide opacity relative to such wavelengths of not substantially less than about 1.3, as required by such equipment. The automated card processing equipment may also include a card embossing/encoding machine having sensor/detector pairs operating in a light wavelength range of about 900–1100 nm. In that case, the filter should provide opacity relative to such wavelengths of not substantially less than about 0.42, as required by such equipment. If the card is to be compatible with both ATMs and card embossing/encoding machines, the filter should comply with the worst-case ATM opacity and wavelength range requirements.

The filter referred to herein includes any suitable medium or device that can provide the opacity required for automated card detection. By way of example, the filter can be made from a variety of light filtering materials, including materials that are light absorbing, light reflecting, light deflecting, or the like, relative to the applicable wavelength range. The filter can also be made from various combinations of such materials. Light absorbing materials that can be used for the filter include colorless light absorbers, light absorbing dyes, and other materials. Light reflecting materials that can be used for the filter include silver compositions, silver-titanium oxide compositions, carbon compositions, and other materials. Light deflecting materials that can be used for the filter include light deflecting films.

In specific filter constructions, a light filtering material can be incorporated in a liquid coating and applied to the material sheet using screen printing or other application methods. Relatedly, the light filtering material can be similarly applied to a solid film that is then secured to the material sheet using lamination techniques, adhesive bonding, or other application methods. In alternative filter constructions, a light filtering material can be incorporated into the material sheet prior to or during extrusion or calendaring thereof (while it is a soft resin), or is sublimated therein by heat diffusion processing, such that the light filtering material is disbursed through all or a portion of the material sheet. Relatedly, the light filtering material can be similarly introduced into a solid film that is then secured to the material sheet. In alternative filter constructions, a light filtering material can be deposited on the material sheet using a suitable deposition technique. Relatedly, the light filtering material can be similarly deposited on a solid film that is then secured to the material sheet. Still other filter constructions will no doubt be apparent to persons skilled in the art in view of the teachings herein.

BRIEF DESCRIPTION OF THE SEVERAL VIEWS OF THE DRAWING

The foregoing and other features and advantages of the invention will be apparent from the following more particular description of a preferred embodiment of the invention, as illustrated in the accompanying Drawing, in which.

DETAILED DESCRIPTION OF THE INVENTION

I. GENERAL CONSIDERATIONS

For purposes of the present description, a transparent medium will be understood to be a material that transmits human-visible light without substantial scattering. A transparent medium allows a person to view definable images through it. A translucent medium will be understood to be a material that transmits human-visible light but with substantial light scattering. A person will be able to see light through a translucent medium but will not see defined images. An opaque medium will be understood as blocking a substantial portion of incident light within a particular wavelength range via absorption, reflection or otherwise. If a medium is opaque to human viewing, a person will not be able to detect any light being transmitting from one side to the other. If a medium is non-opaque to human viewing, it will be at least minimally transparent or translucent and a person will be able to see at least some light being transmitted from one side to the other.

Table 1 below illustrates the correlation between density (opacity) and transmittance as these concepts will be applied in describing the preferred embodiment of the invention. Table 1 is based on conversion calculations of density (opacity) to transmittance using the conversion formula Density=Log (1/ Transmittance).

TABLE I

Correlation for Card Density(Opacity) and Transmittance

| Density (Opacity) | Approximate Light Transmittance | Density (Opacity) | Approximate Light Transmittance |
|---|---|---|---|
| 0.10 | 79% | 0.80 | 16% |
| 0.20 | 63% | 0.90 | 13% |
| 0.30 | 50% | 1.00 | 10% |
| 0.40* | 40%* | 1.30 | 5% |
| 0.42 | 38% | 1.50 | 3% |
| 0.50 | 32% | 2.00 | 1% |
| 0.52 | 30% | 3.00 | 0.1% |
| 0.60 | 25% | 4.00 | 0.01% |
| 0.70 | 20% | | |

*Possible human perception limit of opacity in average visible light conditions

Figure 1:
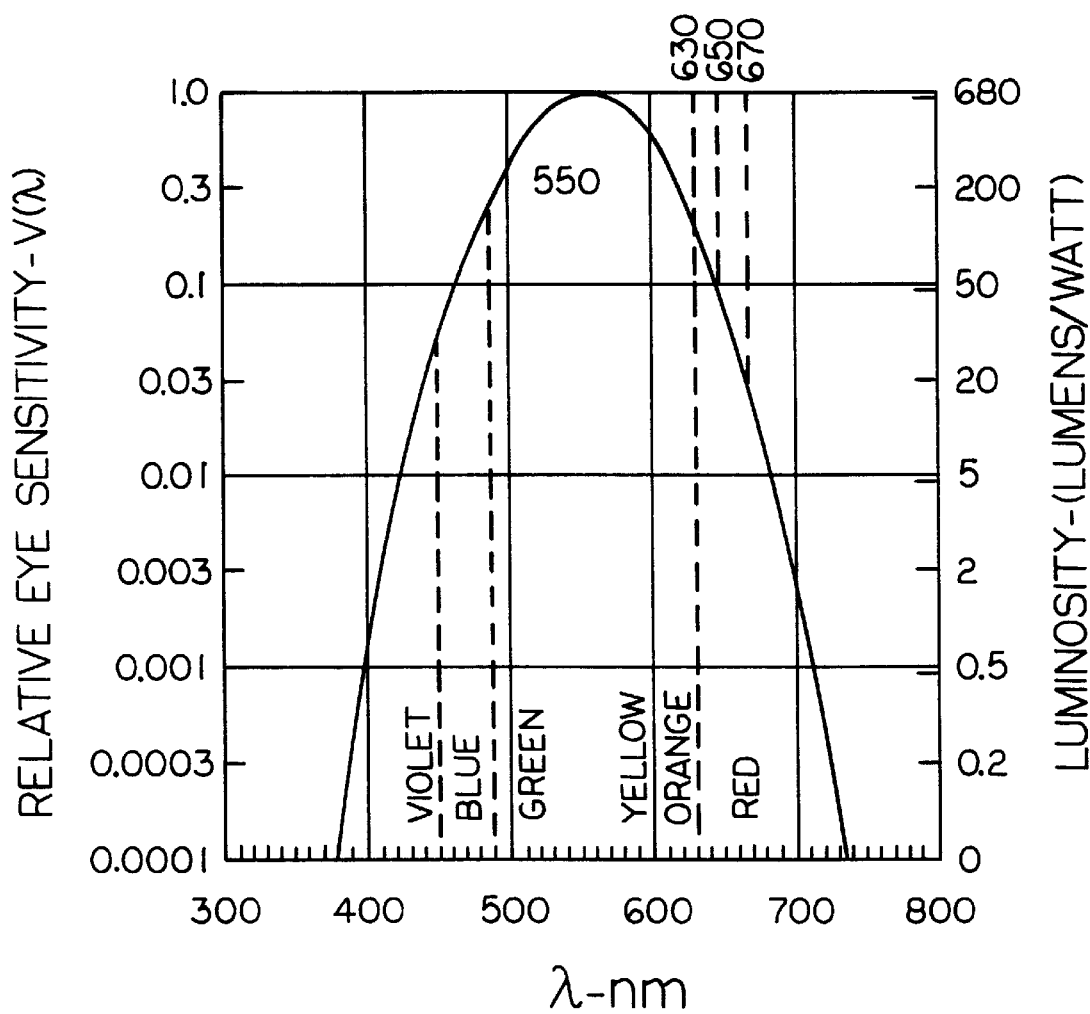
FIG. 1 is a graph showing human eye sensitivity and luminosity as a function of light wavelength.

The primary requirement of a financial transaction card in accordance with the invention is that it must have an area that transmits light in the visible light range of the electromagnetic spectrum (380–750 nm) with sufficient transmittance to be perceived as being at least minimally transparent or translucent by a human viewer. FIG. 1 illustrates relative light sensitivity of the human eye as a function of wavelength. As shown therein, greatest human light sensitivity is at 550 nm. Based on visual correlation between measured card samples and human viewing of those samples under average viewing conditions (e.g., room light), and based on Table 1 above, it has been determined by applicant that a financial transaction card should preferably transmit at least about 40% of incoming visible light (380–750 nm) for it to appear to be noticeably different from a standard opaque card to card users. However, because different transmittance levels may be desired, depending on lighting conditions and other factors, the 40% level should not be construed as limiting relative to the invention disclosed herein.

II. ATM CONSIDERATIONS

The devices for sensing the presence of financial transaction cards in ATMs generally consist of a light source and a detector (having a sensor) paired together to identify the presence of a card if the light source is blocked from the detector. The absence of a card is identified if there is light transmission to the detector. Typically, multiple source/ detector pairs are employed. At least one pair is located at or near the card insertion slot and additional pairs are usually spaced over the entire surface of the card. In order for a financial transaction card to be detected in an ATM, it must be substantially opaque to the detector sensors.

The light sources used in ATM card sensing devices are usually laser diodes. These generally have characteristic narrow output peaks lying within the 750–1200 nm wavelength range. On the other hand, the sensors in ATMs typically have broad sensitivity across the 750–1200 nm wavelength range. The threshold opacity typically required for a financial transaction card to be detected by such sensors is 5% maximum light transmission, which corresponds to a minimum opacity of 1.3, according to Table 1 above. It will be appreciated that these specifications for ATMs may change in the future as this technology further develops.

III. EMBOSSING/ENCODING MACHINE CONSIDERATIONS

Figure 2:
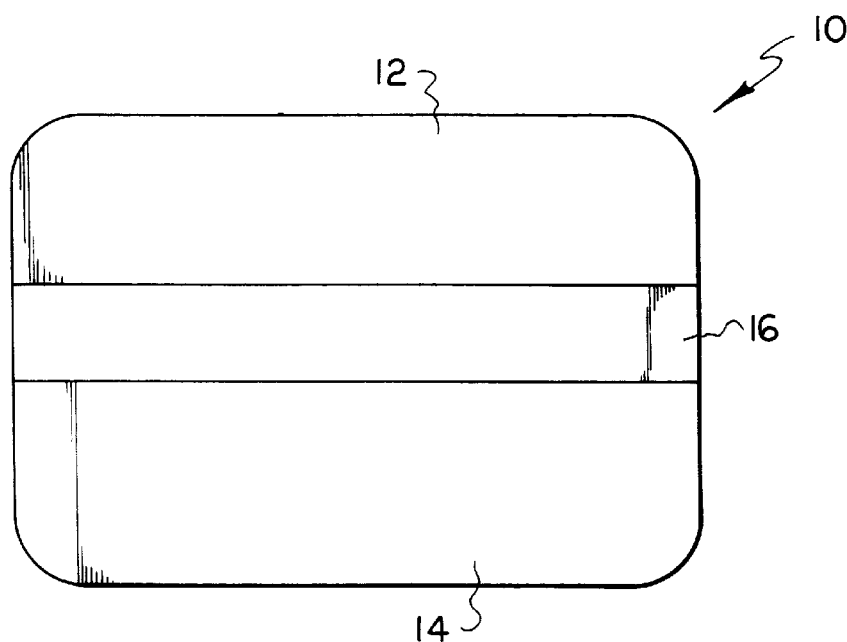
FIG. 2 is a plan view of a financial transaction card showing opacity requirements for a conventional card embossing/encoding apparatus.

Conventional financial transaction card embossing/ encoding machines used during card manufacture typically employ multiple sensors to detect the presence and proper positioning of the cards. For example, the DataCard 9000 machine, manufactured by Datacard Corporation of Minnetonka, Minnesota, has more than fifteen sensors that check for opacity across portions of the card surface. These portions are shown in FIG. 2, which illustrates a card 10 having opaque areas conforming to the requirements of the DataCard 9000 machine. In order for the DataCard 9000 machine to function properly, a first band 12 is required to be opaque and have a band height of at least 0.826 inches, and a second band 14 is required to be opaque and have a band height of at least 1.000 inches. The remaining band 16, having a nominal band height of 0.389 inches, has no requirement for opacity. It will be appreciated that other embossing/encoding equipment may have different opacity requirements.

In the DataCard 9000 machine, the card sensors detect in the near Infrared (IR) spectral region, and specifically in a wavelength range of 900–1100 nm. To be detected by a DataCard 9000 machine, bands 12 and 14 of the card 10 must have a minimal measured opacity of 0.42–052 in this spectral region (i.e., 0.42 at 1100 nm and 0.52 at 900 nm). According to Table 1 above, this corresponds to a maximum transmittance of 30–38% over the applicable spectral range (i.e., 30% at 900 nm and 38% at 1100 run).

IV. PREFERRED TECHNICAL SOLUTION PROVIDED BY THE INVENTION

Figure 3:
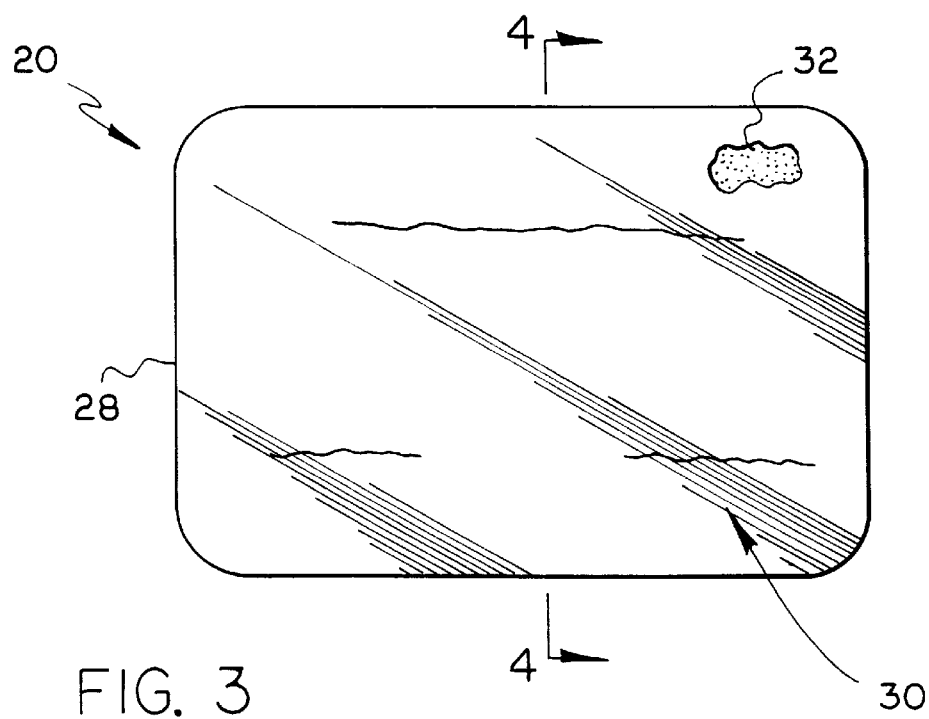
FIG. 3 is a plan view of a financial transaction card constructed in accordance with a preferred embodiment of the present invention.

Turning now to FIGS. 3 and 4*a–f*, a financial transaction card 20 constructed in accordance with a preferred embodiment of the present invention includes a substantially planar material sheet 22 made from polyvinyl sheet stock or other suitable material. The material sheet 22 has upper and lower surfaces 24 and 26, respectively, and a continuous peripheral edge 28. The material sheet 22 is provided with one or more areas that are at least minimally transparent or translucent relative to human-visible light. In FIG. 3, reference number 30 identifies one such area extending over the entire surface of the material sheet 22. To achieve this configuration, the material sheet 22 is preferably made entirely from transparent or translucent (e.g., polyvinyl) sheet stock. To render the area 30 opaque to automated card processing equipment sensors, a filter, partially illustrated by reference numeral 32, is provided. As shown in FIGS. 4*a–f*, the filter 32 can be located at the upper surface 24 of the material sheet 22, or at any location below the upper surface. For example, although not shown, the filter 32 could also be located at or near the lower surface 26 of the material sheet 22.

The filter 32 is designed to provide opacity relative to wavelengths that are within the active wavelength range of the source/detector pairs used in card processing equipment, such as ATMs, embossing/encoding machines, and other devices. Considering sections II and III above, the worst-case scenario may be provided by ATMs, which have source/detector pairs placed across the entire card surface, and which require a minimum opacity of 1.3 over a wavelength range of 750–1200 nm. Thus, to ensure card detection in the widest array of card processing equipment, the filter 32 may be designed to provide an opacity of at least about 1.3 across the ATM wavelength range of 750–1200 nm, and should extend over all transparent or translucent areas. This goal can be satisfied relative to card 20 by extending the filter 32 over the entirety of the transparent or translucent area 30 of the material sheet 22, i.e., over the entire card 20.

The filter 32 can be made in a variety of ways. For example, it can be made from a light filtering material that is either light absorbing, light reflecting, light deflecting or the like, relative to the applicable wavelength range. The filter 32 can also be made from various combinations of such materials. Light absorbing materials that can be used for the filter 32 include colorless light absorbers, light absorbing dyes, and other materials. Light reflecting materials that can be used for the filter 32 include silver compositions, silver-titanium oxide compositions, carbon compositions, and other materials. Light deflecting materials that can be used for the filter 32 include light deflecting films.

Figure 4A:
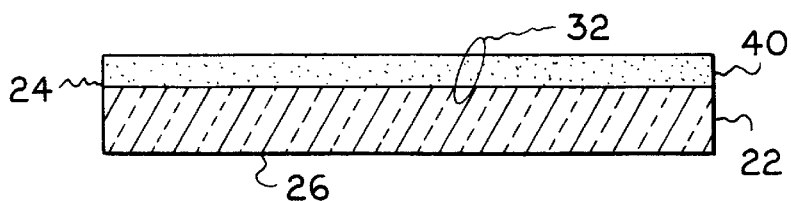
FIGS. 4a, 4b, 4c, 4d, and 4f are cross-sectional views taken along line 4—4 in FIG. 3 having exaggerated thickness to show the construction of a filter in accordance with various fabrication techniques.
Figure 4B:
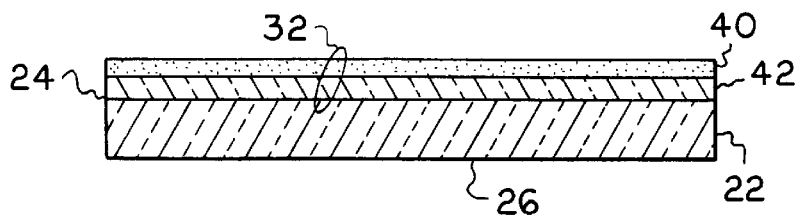

In specific constructions, the filter 32 can be fabricated and applied to the material sheet 22 in a variety of ways. In FIG. 4*a*, a suitable light filtering material is added to a liquid carrier and applied as a coating 40 to the material sheet 22 using screen printing or other application methods. In FIG. 4*b*, a suitable light filtering material is added to the same liquid carrier and applied as a coating 40 on a film 42 using screen printing or other methods, and the film 42 is then itself secured to the material sheet using lamination techniques, adhesive bonding, or other application methods.

Figure 4C:
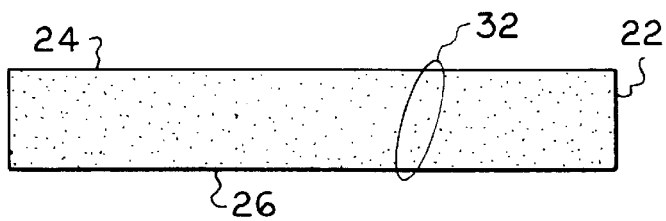
Figure 4D:
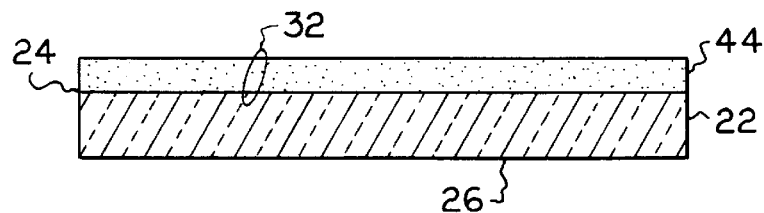

In FIG. 4*c*, a suitable light filtering material is incorporated into the material sheet 22 prior to or during calendaring or extrusion thereof (when it is a soft resin), or is sublimated therein by heat diffusion processing, such that the light filtering material is disbursed through all or a portion of the material sheet. In FIG. 4*d*, a suitable light filtering material is incorporated in a film 44 during calendaring or extrusion thereof (when it is a soft resin), or is sublimated therein by heat diffusion processing. The film 44 is then itself secured to the material sheet 22 using lamination techniques, adhesive bonding, or other application methods.

Figure 4E:
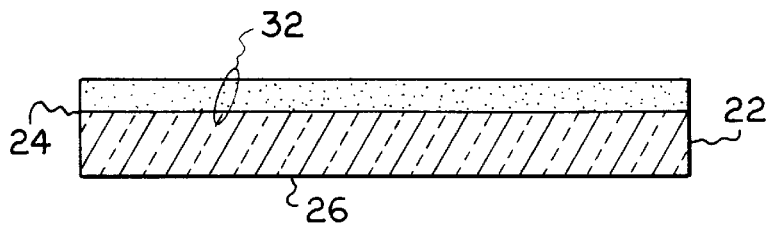
Figure 4F:
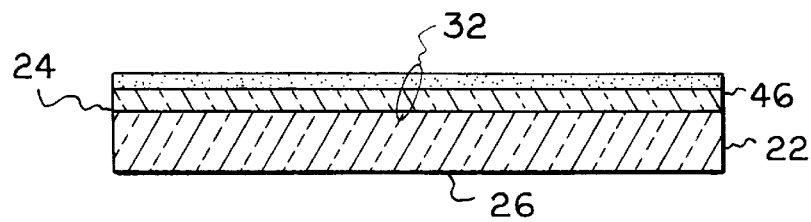

In FIG. 4*e*, a suitable light filtering material is deposited on the material sheet 22 using a suitable deposition technique (e.g., vacuum deposition). In FIG. 4*f*, a suitable light filtering material is deposited on a film 46 using a suitable deposition technique and the film is then itself secured to the material sheet 22 using lamination techniques, adhesive bonding, or other application methods.

Still other filter constructions will no doubt also be apparent to persons skilled in the art in view of the teachings herein. Specific construction examples follow:

EXAMPLE 1

A colorless absorbent powdered light filtering material, sold under the name ADS1060A by American Dye Source Inc. of Mount Royal, Quebec, Canada, is dissolved into a clear coating, sold under the name Naz Dar 132688AB by Naz Dar Co., Inc. of Chicago, Ill., at 0.2–5% by weight. This material is coated (using one or more layers as necessary) onto a transparent 15 mil calendared vinyl film with screen printing (330 mesh screen). The film is then compression laminated onto a transparent 15 mil polyvinyl base sheet (30 mil total thickness).

EXAMPLE 2

A dye, sold under the name 3D Blue Dye by Coburn Corp. of Lakewood, N.J., is incorporated into a transparent 5 mil vinyl film prior to or during extrusion or calendaring thereof, or is sublimated therein by heat diffusion processing. The film is then compression laminated (using one or more layers as necessary) onto a transparent polyvinyl base sheet (30 mil total thickness).

EXAMPLE 3

A silver-titanium oxide coating, sold under the registered trademark SOL-MOX by Innovative Specialty Films LLC, of San Diego, Calif., is applied to the surface of a transparent 3 mil polyester film using vacuum deposition processing. The film is then compression laminated (using one or more layers as necessary) onto a transparent polyvinyl base sheet (30 mil total thickness).

EXAMPLE 4

An IR absorbing particulate such as a carbon or silver compound is suspended in a transparent coating material sold under the name Naz Dar 132688AB by Naz Dar Co., Inc. of Chicago, Ill., at 0.1–10% by weight. This material is screen printed (using one or more layers as necessary) onto a 15 mil transparent vinyl film. The film is then compression laminated onto a transparent 15 mil polyvinyl base sheet (30 mil total thickness).

Accordingly, a financial transaction card that is transparent or translucent human viewing yet detectable by automated card processing equipment has been disclosed. While various embodiments have been shown and described, it should be apparent that many variations and alternative embodiments would be apparent to those skilled in the art in view of the teachings herein. For example, although specific automated card processing equipment with characteristic source/detector wavelength and opacity requirements are described, it will be appreciated that the concepts of the present invention can be applied to financial transaction cards used in other equipment having different wavelength and opacity requirements. In addition, although specific filter constructions are described it will be appreciated that many other filter designs may be utilized to achieve successful implementation of the invention. It will be understood, therefore, that the invention is not to be in any way limited except in accordance with the spirit of the appended claims and their equivalents.

What is claimed is:

1. A financial transaction card that is transparent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted from said source to said detector due to the presence of said card, comprising:

a substantially planar material sheet having upper and lower surfaces bounded by a continuous peripheral edge;

said material sheet being transparent to human viewing; and a near Infrared light filter covering one of said upper or lower surfaces of said material sheet, said filter comprising filtering means for producing sufficient card opacity relative to one or more near Infrared light wavelengths to render said card detectable by said source/detector pairs by blocking near Infrared light emitted by said source from reaching said detector, thereby triggering detection of said card, while still allowing said card to remain transparent to visible light such that definable images can be viewed through said card.

2. A financial transaction card in accordance with claim 1 wherein said automated card processing equipment includes card embossing machines having source/detector pairs operating in a light wavelength range of about 900–1100 nm, and wherein said filter has an opacity relative to one or more wavelengths in said range of not substantially less than about 0.4.

3. A financial transaction card in accordance with claim 1 wherein said automated card processing equipment includes automated teller machines having source/detector pairs operating in a light wavelength range of about 750–1200 nm, and wherein said filter has an opacity relative to one or more wavelengths in said range of not substantially less than about 1.3.

4. A financial transaction card in accordance with claim 1 wherein said automated card processing equipment includes card embossing/encoding machines having source/detector pairs operating in a light wavelength range of about 900–1100 nm, and automated teller machines having source/detector pairs operating in a light wavelength range of about 750–1200 nm, and wherein said filter has an opacity relative to one or more wavelengths in said automated teller machine wavelength range of not substantially less than about 1.3.

5. A financial transaction card in accordance with claim 1 wherein said filter is a light absorbing material, a light reflecting material, a light deflecting material, or a combination of two or more such materials.

6. A financial transaction card in accordance with claim 1 wherein said filter is formed as a combination of a light absorbing material and a light reflecting or deflecting material.

7. A financial transaction card in accordance with claim 6 wherein said filter is a clear light absorbing material providing the requisite light filtering properties.

8. A financial transaction card in accordance with claim 6 wherein said filter is formed from a light absorbing dye.

9. A financial transaction card in accordance with claim 6 wherein said filter is formed from a light reflecting material.

10. A financial transaction card in accordance with claim 1 wherein said filter is formed from a light filtering material disbursed through said material sheet.

11. A method for manufacturing a financial transaction card that is transparent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted by said source to said detector due to the presence of said card, comprising:

selecting a substantially planar material sheet having upper and lower surfaces bounded by a continuous peripheral edge;

said material sheet being transparent to human viewing;

applying a near Infrared filter to cover one of said upper or lower surfaces of said material sheet, said filter producing sufficient card opacity relative to one or more near Infrared light wavelengths to render said card detectable by said source/detector pairs by blocking near Infrared light emitted by said source from reaching said detector, thereby triggering detection of said card, while still allowing said card to remain transparent to visible light such that definable images can be viewed through said card.

12. A method in accordance with claim 11 wherein said automated card processing equipment includes card embossing machines having source/detector pairs operating in a light wavelength range of about 900–1100 nm, and wherein said filter has an opacity relative to one or more wavelengths in said range of not substantially less than about 0.4.

13. A method in accordance with claim 11 wherein said automated card processing equipment includes automated teller machines having source/detector pairs operating in a light wavelength range of about 750–1200 nm, and wherein said filter has an opacity relative to one or more wavelengths within said range of not substantially less than about 1.3.

14. A method in accordance with claim 11 wherein said automated card processing equipment includes card embossing/encoding machines having source/detector pairs operating in a light wavelength range of about 900–1100 nm, and automated teller machines having source/detector pairs operating in a light wavelength range of about 750–1200 nm, and wherein said filter has an opacity relative to one or more wavelengths in said automated teller machine wavelength range of not substantially less than about 1.3.

15. A method in accordance with claim 11 wherein said filter is a light absorbing material, a light reflecting material, a light deflecting material, or a combination of two or more such materials.

16. A method in accordance with claim 11 wherein said filter is formed as a combination of a light absorbing material and a light reflecting or deflecting material.

17. A method in accordance with claim 16 wherein said filter is formed from a clear light absorbing material providing the requisite light filtering properties.

18. A method in accordance with claim 16 wherein said filter is formed from a light absorbing dye.

19. A method in accordance with claim 16 wherein said filter formed from a light reflecting material.

20. A method in accordance with claim 11 wherein said filter is formed from a light absorbing material disbursed through said material sheet.

21. A financial transaction card that is transparent to human viewing yet detectable by automated card processing equipment having near Infrared source/detector pairs each having a source and a detector respectively positioned to face opposing sides of said card when said card is positioned in said equipment for detection and to detect said card by sensing an interruption of near Infrared light transmitted by said source to said detector due to the presence of said card, comprising:

a sheet of material that is transparent to human viewing and having upper and lower surfaces bounded by a continuous peripheral edge;

a filter applied to cover one of said upper or lower surfaces of said material sheet;

said filter comprising a screen-printed coating on said material sheet of a light absorbing powder dissolved in a clear liquid carrier at a powder-to-carrier ratio of about 0.2–5% by weight; and said filter producing sufficient card opacity relative to one or more near Infrared light wavelengths to render said card detectable by said source/detector pairs by blocking near Infrared light emitted by said source from reaching said detector, thereby triggering detection of said card, while still allowing said card to remain transparent to human visible light such that definable images can be viewed through said card.

* * * * *